(12) United States Patent  (10) Patent No.: US 7,517,008 B2
Ebel  (45) Date of Patent: Apr. 14, 2009

(54) REMOTE RELEASE SEAT CUSHION LOCK WITH ONE HAND OPERATION

(75) Inventor: Michael Ebel, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 11/565,688

(22) Filed: Dec. 1, 2006

(65) Prior Publication Data
US 2007/0182227 A1 Aug. 9, 2007

Related U.S. Application Data

(60) Provisional application No. 60/771,127, filed on Feb. 7, 2006.

(51) Int. Cl.
A47C 9/06 (2006.01)
(52) U.S. Cl. .......... 297/14; 297/331; 297/335; 297/336; 296/65.05; 296/65.08
(58) Field of Classification Search .......... 297/14, 297/331, 335, 336; 296/65.05, 65.08
See application file for complete search history.

(56) References Cited

U.S. PATENT DOCUMENTS

| 920,542 | A |   | 5/1909 | Clark |            |
|---------|---|---|--------|-------|------------|
| 4,527,828 | A | * | 7/1985 | Groce et al. | 296/65.09 |
| 4,793,649 | A |   | 12/1988 | Yamano et al. |  |
| 4,993,666 | A |   | 2/1991 | Baymak et al. |  |
| 5,156,438 | A |   | 10/1992 | Hayakawa et al. |  |
| 5,320,411 | A |   | 6/1994 | Sera et al. |  |
| 5,425,568 | A |   | 6/1995 | Sliney et al. |  |
| 5,498,052 | A | * | 3/1996 | Severini et al. | 296/65.09 |
| 6,012,771 | A | * | 1/2000 | Shea | 297/216.1 |
| 6,135,555 | A |   | 10/2000 | Liu et al. |  |
| 6,293,603 | B1 | * | 9/2001 | Waku et al. | 296/65.09 |
| 6,460,922 | B1 |   | 10/2002 | Demick |  |
| 6,513,873 | B2 | * | 2/2003 | Tsuda et al. | 297/253 |
| 6,523,899 | B1 | * | 2/2003 | Tame | 297/331 |
| 6,572,192 | B2 | * | 6/2003 | Pichon et al. | 297/335 |
| 6,598,926 | B1 | * | 7/2003 | Price et al. | 296/65.09 |
| 6,767,061 | B2 |   | 7/2004 | Ogino et al. |  |
| 6,817,660 | B2 |   | 11/2004 | Ito et al. |  |
| 6,883,854 | B2 |   | 4/2005 | Daniel et al. |  |
| 6,959,960 | B2 |   | 11/2005 | Buccinna et al. |  |

(Continued)

FOREIGN PATENT DOCUMENTS

EP 0978414 A2 2/2000

(Continued)

Primary Examiner—Katherine W Mitchell
Assistant Examiner—Philip S Kwon
(74) Attorney, Agent, or Firm—Gifford, Krass, Sprinkle, Anderson & Citkowski, P.C.

(57) ABSTRACT

A seat assembly supports an occupant in a passenger compartment of a vehicle. The seat assembly includes a seat cushion pivotally coupled to the vehicle for movement about a first pivot axis between a generally horizontal seating position and a generally upright stowed position. The first pivot axis being fixed with respect to the vehicle. The seat assembly also includes a seat back pivotally coupled to seat cushion for pivotal movement relative to the seat cushion about a second pivot axis, such that the seat back is displaced rearwardly as the seat cushion is moved toward the stowed position.

1 Claim, 5 Drawing Sheets

U.S. PATENT DOCUMENTS

| | | | |
|---|---|---|---|
| 7,152,925 B2 * | 12/2006 | Hur et al. | 297/378.13 |
| 7,255,384 B2 * | 8/2007 | Saberan et al. | 296/65.09 |
| 7,270,371 B2 * | 9/2007 | Adragna et al. | 297/14 |
| 7,293,835 B2 * | 11/2007 | Yudovich | 297/335 |
| 2005/0057081 A1 * | 3/2005 | Kahn et al. | 297/331 |
| 2006/0152055 A1 * | 7/2006 | Yudovich | 297/331 |

FOREIGN PATENT DOCUMENTS

| | | |
|---|---|---|
| EP | 1568536 A2 | 8/2005 |
| GB | 2337925 A | 12/1999 |
| JP | 2000197537 A | 7/2000 |

* cited by examiner

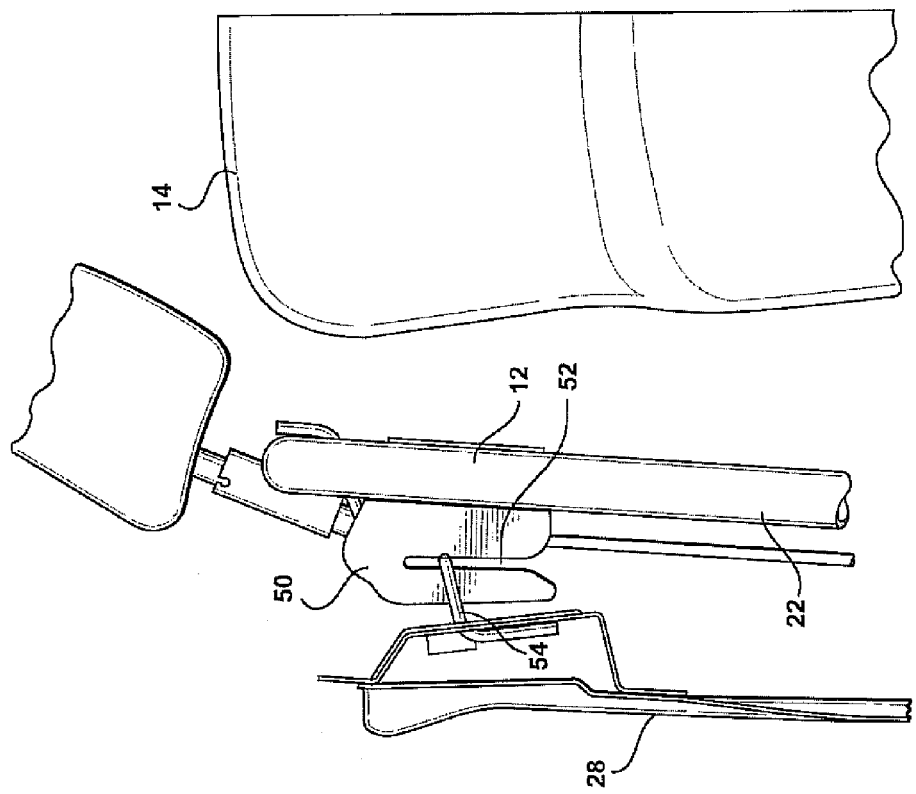
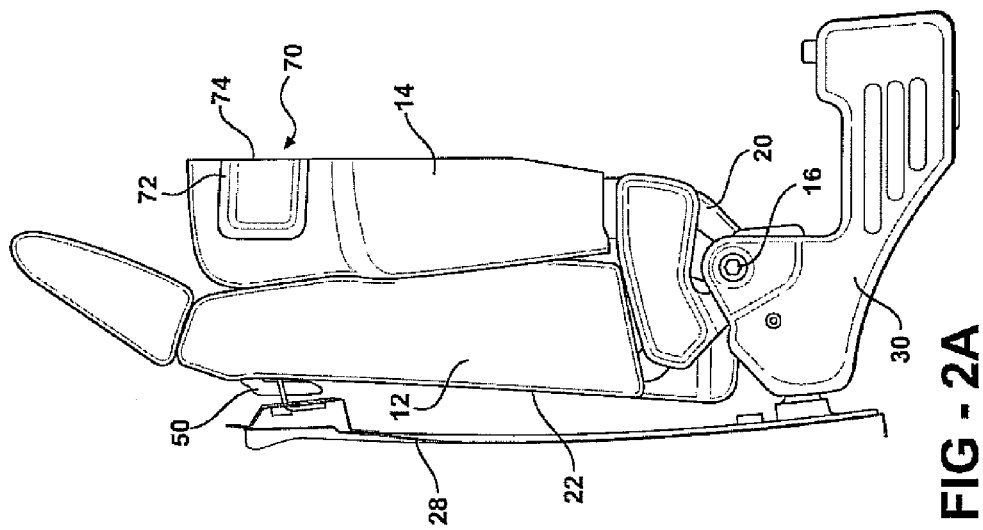

REMOTE RELEASE SEAT CUSHION LOCK WITH ONE HAND OPERATION

CROSS REFERENCE TO RELATED APPLICATION

This application claims priority to U.S. provisional patent application No. 60/771,127, which was filed Feb. 7, 2006 and is incorporated herein by reference in its entirety.

BACKGROUND OF THE INVENTION

1. Field of the Invention

The invention relates to seat assemblies for use in automotive vehicles. More particularly, the invention relates to a seat assembly having a folding cushion and remote lock release configured for one handed operation.

2. Description of the Related Art

Automotive vehicles includes seat assemblies for supporting occupants within an interior passenger compartment. It is known to provide seats with folding seat backs to increase the cargo carrying capacity of the vehicle. Yet, it remains desirable to provide improved seat designs that enhance the cargo capacity of the vehicle and are easily actuated between stowed and seating positions.

SUMMARY OF THE INVENTION

According to one aspect of the invention, a seat assembly is provided for supporting an occupant in a passenger compartment of a vehicle. The seat assembly includes a seat cushion pivotally coupled to the vehicle for movement about a first pivot axis between a generally horizontal seating position and a generally upright stowed position. The first pivot axis being fixed with respect to the vehicle. The seat assembly also includes a seat back pivotally coupled to seat cushion for pivotal movement relative to the seat cushion about a second pivot axis, such that the seat back is displaced rearwardly as the seat cushion is moved toward the stowed position.

BRIEF DESCRIPTION OF THE DRAWINGS

Advantages of the present invention will be readily appreciated as the same becomes better understood by reference to the following detailed description when considered in connection with the accompanying drawing, wherein:

FIG. 2A is an enlarged side view of the seat assembly with the seat cushion in the stowed position;

FIG. 2B is an enlarged side view of the seat back frame when the seat cushion (not shown) is in the stowed position

DETAILED DESCRIPTION OF THE INVENTION

Figure 1B:
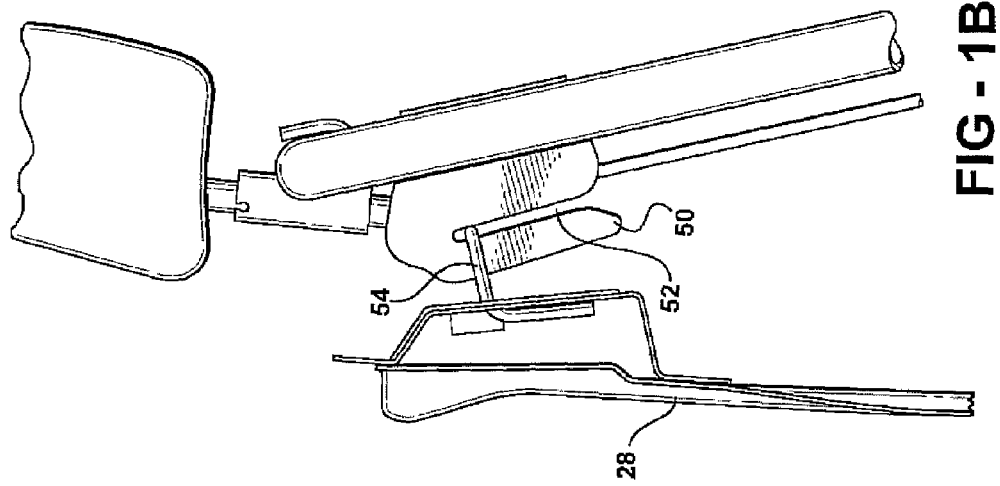
FIG. 1B is an enlarged side view of the seat back frame when the seat cushion (not shown) is in the seating position.
Figure 1A:
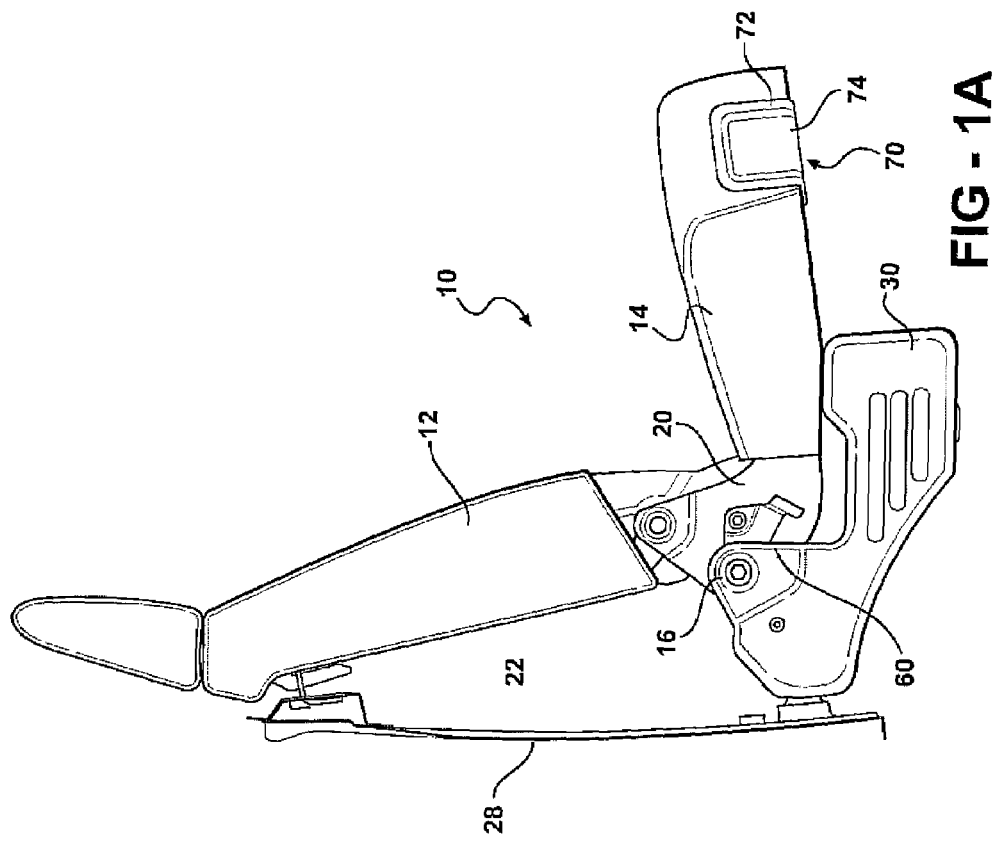
FIG. 1A is a side elevational view of a seat assembly according to the invention, shown with the seat cushion in the seat position.

Referring to the figures, a seat assembly for use in an automotive vehicle is generally indicated at 10. The seat assembly 10 includes a seat back 12 and a seat cushion 14. The seat cushion 14 is fixedly secured to a pivot bracket 20, also referred to as bracket 20. The seat cushion 14 is selectively movable between a generally horizontal seating position, shown in FIG. 1, and an upright stowed position, shown in FIG. 2.

The pivot bracket 20 is pivotally coupled to a locking mechanism 60 for pivotal movement of the seat cushion 14 about a first pivot axis 16. The locking mechanism 60 is mounted to the riser and pivotably coupled to the pivot bracket 20 about the first pivot axis. The seat cushion 14 is fixedly attached to the pivot bracket 20, and is operable to move between a horizontal seating position to the stowed position about the first pivot axis. The locking mechanism is operable to engage the pivot bracket 20 when the seat cushion 14 is positioned in the horizontal seating position so as to lock the seat cushion 14 in the horizontal seating position.

Figure 3:
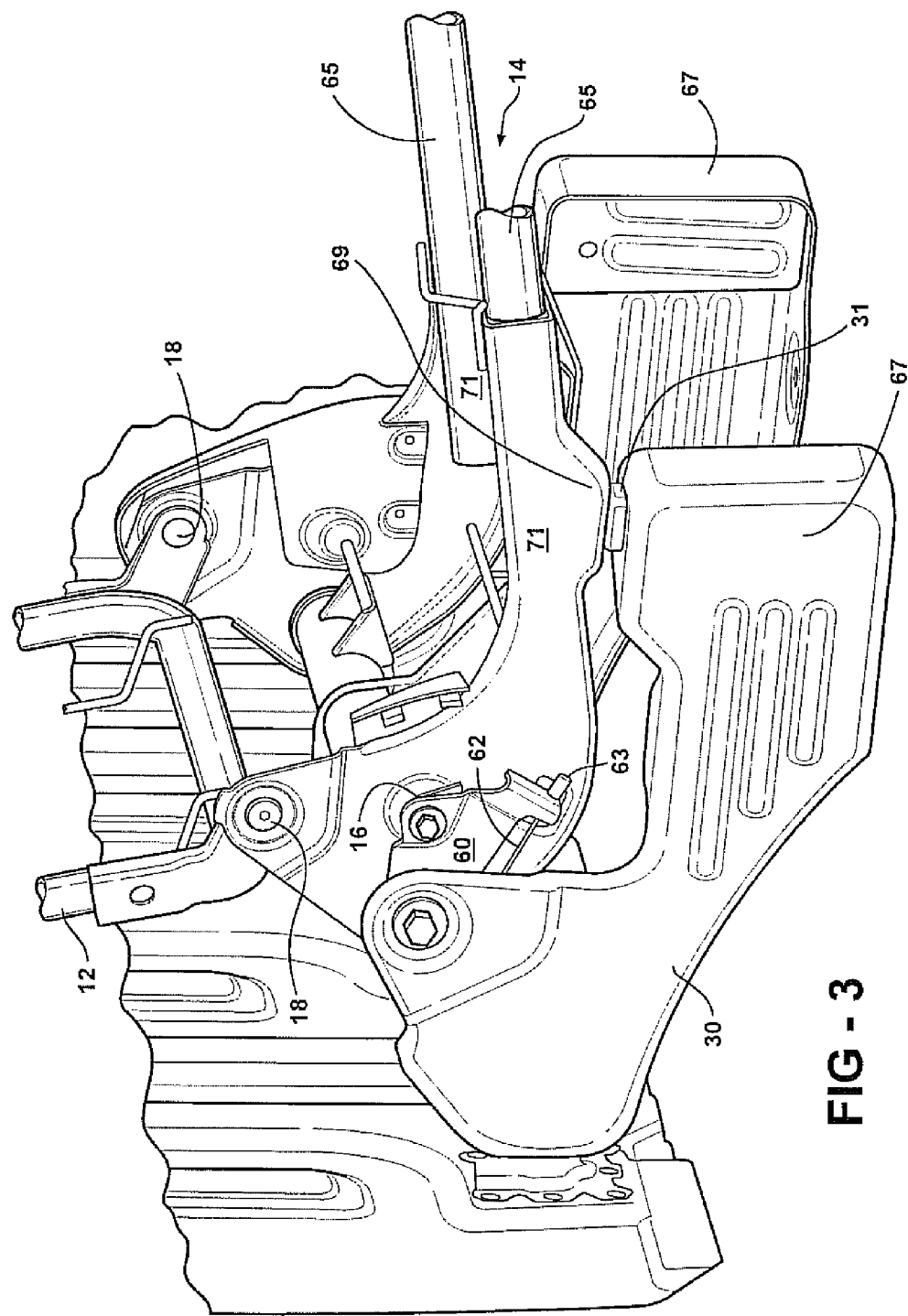
FIG. 3 is an enlarged perspective view of the frame of the seat assembly with the seat cushion in the seating position.
Figure 4:
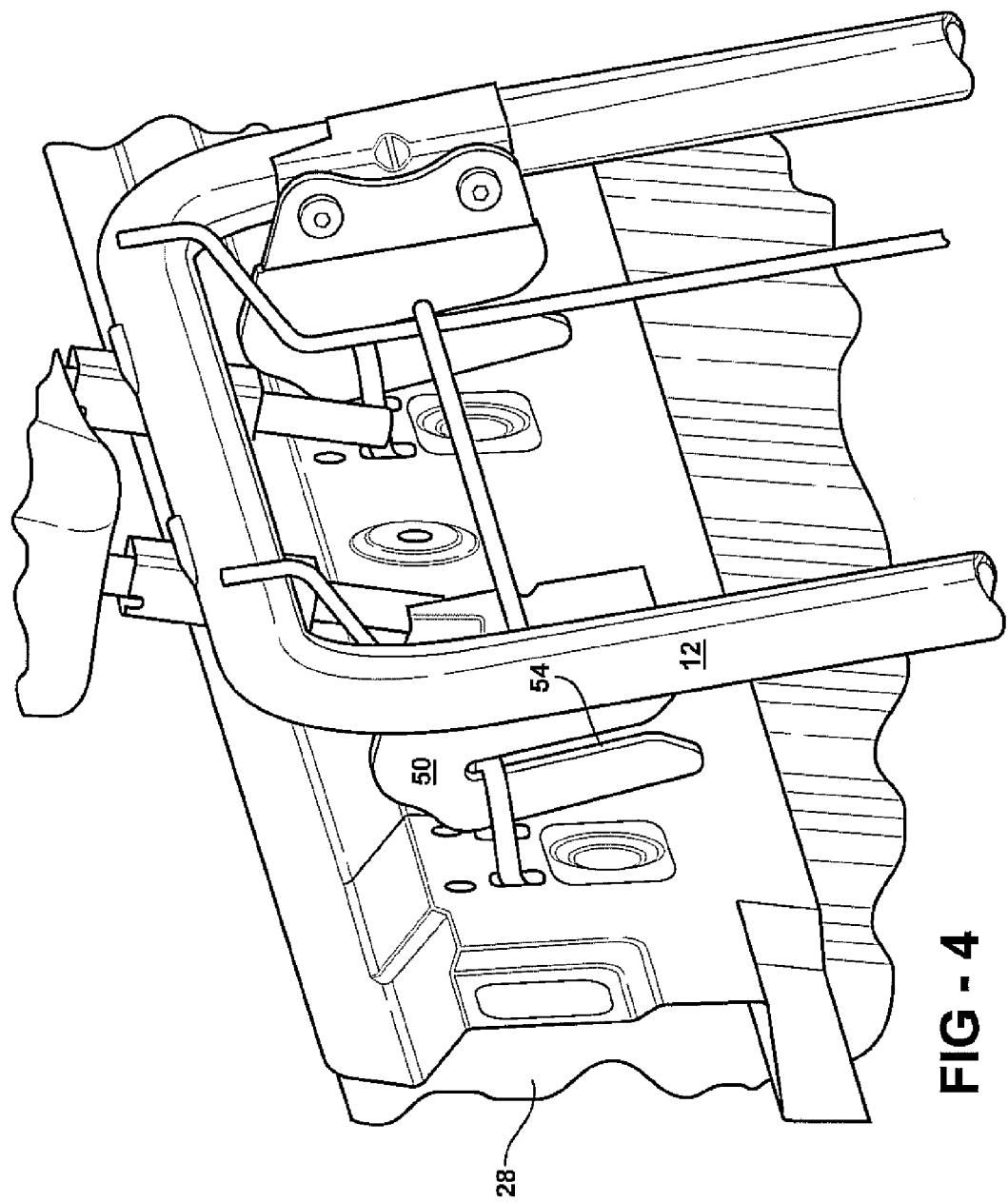
FIG. 4 is an enlarged perspective view of the seat back frame when the seat cushion (not shown) is in the seating position.
Figure 6:
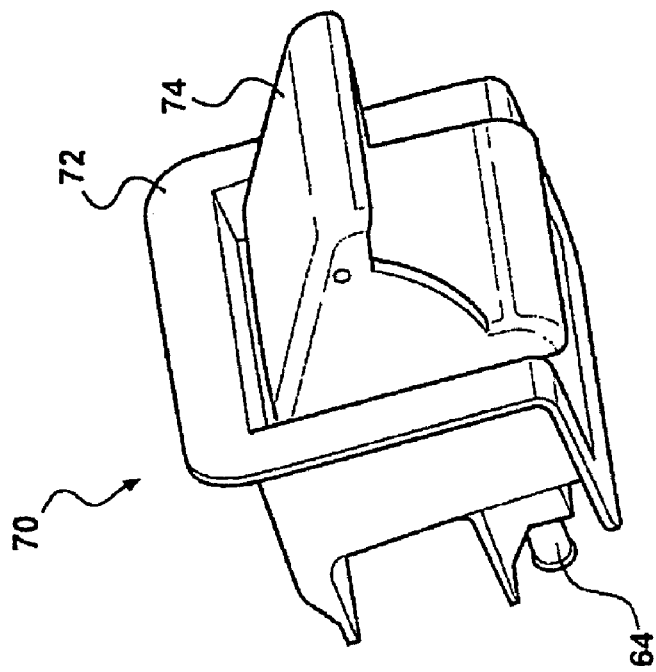
FIG. 6 is a perspective view of the release lever in an actuated position.
Figure 5:
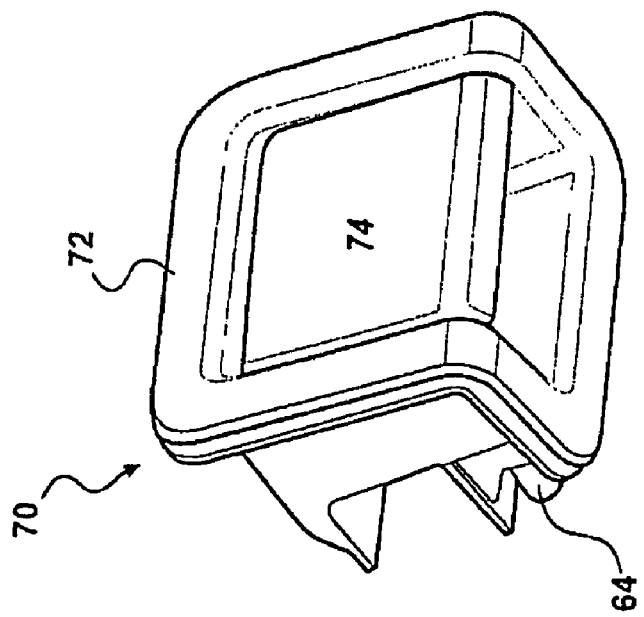
FIG. 5 is a perspective view of a release lever for releasing the seat cushion from the seating position.

A pair of tubular housing portions 71 is integrally formed to the pivot bracket 20. Each of the tubular housing portions 71 is spaced apart from the other and each of the tubular housing portions 71 includes a ridge 69. Bach tubular housing portion 71 is configured to receive one of a pair of elongated support members 65. The seat cushion 14 includes a pair of channels (not shown) configured so as to receive each of the pair of elongated support members 65. As shown in FIG. 3, the riser includes a pair of support portions 67. A pad 31 is disposed on each of the support portions 67 so as to provide a cushion for which each ridge 69 may rest upon when the seat is pivotably positioned in the horizontal seating position.

A bottom end of the seat back 12 is pivotally coupled to the pivot bracket 20 defining a second pivot axis 18. The second pivot axis 18 is generally parallel to and spaced apart from the first pivot axis 16. The seat back 12 is movably coupled to a back wall 28 of the vehicle passenger compartment to accommodate pivotal and vertical displacement of the seat back 12 during articulation of the seat cushion 14 between the stowed and seating positions. More specifically, a hook 50 extends from a back surface 22 of the seat back 12. The hook 50 has a substantially vertically oriented slot 52 slidably engaged with a striker 54 extending outwardly from the back wall 28. By this arrangement, the seat back 12 may be displaced upwardly and then downwardly in response to pivotal movement of the seat cushion 14 between the seating and stowed positions. The upward and downward displacement of the seat back 12 as the seat cushion 14 is moved between seating and stowed positions is caused by the pivotal movement of the second pivot axis 18 about the first pivot axis 16 between opposite sides of a top dead center position.

The seat back 12 also pivots about the sinker 54 as the seat cushion 14 moves between the seating and stowed positions. As the seat cushion 14 is moved to the stowed position, the bottom end of the seat back 12 pivots about the sinker 54. This pivotal movement of the seat back 12 about the striker 54 allows the seat back 12 to be in a substantially vertical position aligned with the seat cushion 14 in the stowed position.

With reference now to figure 3, a locking mechanism 60 selectively locks the seat cushion 14 in the seating and stowed position. The locking mechanism 60 is internally biased toward the locked state. The locking mechanism includes a cable 62, such as a bowden cable, interconnecting the locking mechanism 60 to a lever assembly 70. Actuation of a bowden cable 62 unlocks the locking mechanism 60. One end of Pie bowden cable 62 is connected to the lever assembly 70 and the oilier end of the bowden cable 62 is connected to die locking mechanism 60. The cable 62 is actuated by the lever assembly 70, as shown in FIGS. 1A, 3, 5, and 6. The lever assembly 70 includes a bezel 72 and a handle 74. The handle 74 is pivotally coupled to the bezel 72. The cable 62 is coupled to the handle 74 so that pivotal movement of the handle 74 relative to the bezel 72 actuates the cable 62, thereby unlocking the locking mechanism 60. In operation, the actuation of the handle causes the bowden cable 62 to pull the locking mechanism thus disengaging the locking mechanism from the bracket 20. The seat cushion 14 is then free to move. When die seat cushion 14 is placed in the horizontal position, the resiliency of the locking member urges the locking member into engagement with the bracket 20 and locks the seat cushion 14 into the horizontal position.

The lever assembly 70 is located along a front corner of the seat cushion 14 and spaced apart from the first pivot axis 16 to provide mechanical advantage to the user while moving the seat cushion 14 between the seating position and the stowed position. Additionally, the handle 74 pivots upwardly relative to the bezel 72 when actuated to facilitate lifting the seat cushion 14 from the seating position toward the stowed position and one-handed operation of the seat cushion 14 by a user standing outside of the vehicle.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced oilier than as specifically described.

I claim:

1. A seat assembly for supporting an occupant in a passenger compartment of a vehicle, the seat assembly comprising:

a riser having a pair of support portions spaced apart from each other;

each of the support portions having a respective first ridge, wherein each of the pair of support portions has a respective pad, each respective pad disposed on top of each respective first ridge;

a locking mechanism mounted to the riser;

a bracket pivotably mounted to the locking mechanism so as to pivot about a first pivot axis, the bracket includes a pair of tubular housing portions, each of the tubular housing portions includes a respective second ridge, and each of the tubular housing portions is spaced apart from the other, and wherein each of the pads is registered to receive one of the respective second ridges of the tubular housing portions when the seat cushion is pivoted to the horizontal seating position;

a seat cushion including a pair of elongated support members for supporting the seat cushion, wherein each of pair of elongated support members is configured to engage each of the pair of tubular housing portions so as to fixedly mount the seat cushion to the bracket and move the seat cushion between the generally horizontal seating position and the generally upright stowed position about the first pivot axis;

a seat back pivotably mounted to the bracket so as to pivot about a second pivot axis, and wherein the seat back pivots about the second pivot axis so as to be displaced rearwardly as the seat cushion is moved towards the stowed position;

a hook extending from a back surface of the seat back, the hook having a substantially vertical slot;

a striker extending outwardly from the vehicle, wherein the hook is engaged with the striker so as to allow for generally vertical movement of the seat back during actuation of the seat cushion between the seating position and the stowed position;

a cable having a first end opposite a second end, wherein the first end is attached to the locking mechanism;

a lever assembly including a lever housed within a bevel, and the second end of the cable is attached to the lever, and wherein the lever assembly is operable to actuate the locking mechanism so as to lock and release the seat cushion in the seating and stowed position.

* * * * *

UNITED STATES PATENT AND TRADEMARK OFFICE
CERTIFICATE OF CORRECTION

PATENT NO. : 7,517,008 B2  
APPLICATION NO. : 11/565688  
DATED : April 14, 2009  
INVENTOR(S) : Michael John Ebel Page 1 of 1

It is certified that error appears in the above-identified patent and that said Letters Patent is hereby corrected as shown below:

Column 2, line 21 replace "Bach" with --Each--

Column 2, line 49 replace "sinker" with --stricker--

Column 2, line 52 replace "sinker" with --stricker--

Column 2, line 62 replace "Pie" with --the--

Column 2, line 64 replace "oiler" with --other--

Column 2, line 64 replace "die" with --the--

Column 3, line 7 replace "die" with --the--

Column 3, line 27 replace "oiler" with --other--

Signed and Sealed this

Twenty-third Day of June, 2009

JOHN DOLL  
*Acting Director of the United States Patent and Trademark Office*